Dec. 28, 1965        H. G. OSWIN        3,226,263
FUEL CELL ELECTRODES
Filed July 20, 1960
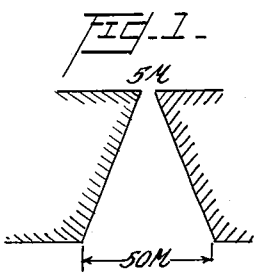
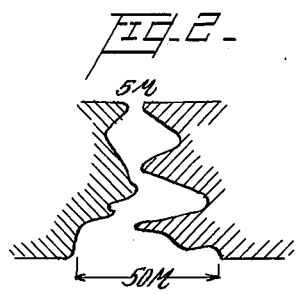
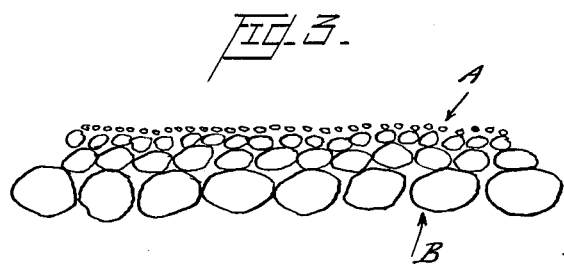
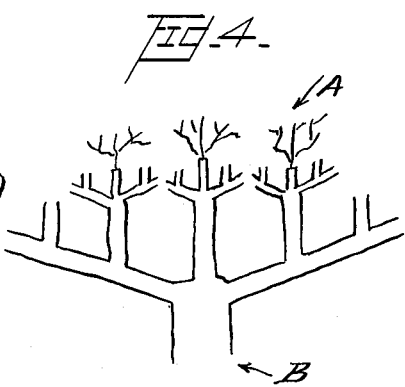
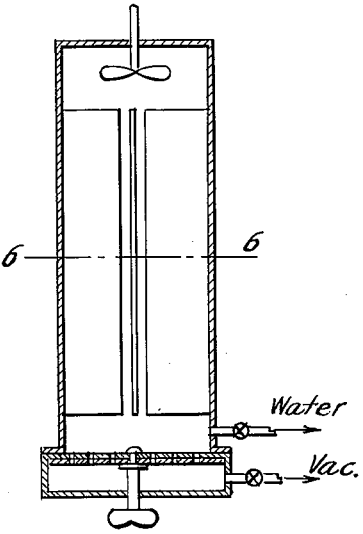
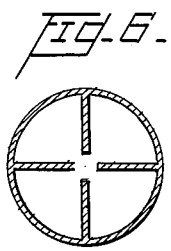
INVENTOR
Harry G. Oswin
BY
Watson, Cole, Grindle & Watson
ATTORNEYS 3,226,263
FUEL CELL ELECTRODES
Harry Godfrey Oswin, Elmsford, N.Y., assignor to Leesona Corporation, Cranston, R.I., a corporation of Massachusetts
Filed July 20, 1960, Ser. No. 44,103
4 Claims. (Cl. 136—120)

This invention relates to improved fuel cell electrodes and to their method of manufacture. More particularly, the invention relates to multiporous structures in which the pore size changes uniformly between the two surfaces. Such structures are particularly well suited for the fabrication of fuel cell electrodes.

"Fuel cell," as used in this specification, is the common name applied to an electrochemical cell capable of generating electrical energy through electrochemical combustion of a fuel gas with an oxygen containing gas. Such cells are not novel and have been fully described in the literature. Their precise construction and operation does not form a part of the instant invention except in an incidental capacity. However, a brief description of the nature and construction of a simple fuel cell is helpful, if not essential, in understanding the function and importance of the instant invention.

In general, the simplest fuel cell comprises a housing, two electrodes and an electrolyte which acts as an oxygen transferring medium. An oxidizing gas such as air under super-atmospheric pressures is circulated on one side of the oxidizing electrode and a fuel gas such as hydrogen, under super-atmospheric pressure is circulated on one side of the other electrode. A three-phase interface exists at each electrode, i.e., gas, electrolyte, and solid where a process of adsorption and de-adsorption occurs generating an electrochemical force. When current is drained from the two electrodes there is a net flow of electrons from the fuel gas side through an external electrical circuit to the oxidizing gas side. Thus, according to the external electron flow convention, the oxidizing gas electrode is the positive electrode and the fuel gas electrode is the negative electrode. Oxygen is consumed at the positive electrode surface and fuel gas is oxidized into products of combustion at the negative electrode surface. The result is accompanied by release of a portion of the energy of combustion as electrical energy while the remainder is released as heat.

In the past it was necessary to regulate the three-phase interface of solid-gas-electrolyte by a suitable combination of pore size, pressure differential of the gas, and surface tension of the electrolyte. As a practical matter, however, it was impossible to maintain completely uniform pore size; thus, the cell was always operated with some of the smaller cells flooded with electrolyte due to capillary action or with gas bubbling through the larger pores unused. To a large extent the advent of a bi-porous electrode structure solved the problem. In a bi-porous system, large pores front the gas of the fuel cell system and the smaller pores face the electrolyte. A three-phase interface occurs substantially at the bi-porous wall.

In the prior art, a bi-porous structure was made by using fractionated powders having well defined pore size. The usual process employed in making the bi-porous structure was to first form a porous plate using fractionated powders having about a 50 to 100 micron particle size by compacting and sintering and thereafter, superimpose a fine pore layer upon the coarser-pore plate. This method is of course very expensive since it necessitates carefully fractionated powders and to a large extent a duplication of steps. Further, for fuel cell electrodes it is not always necessary or for that matter desirable that the porous structure have uniform pore size. It is, however, necessary that the change of pore size through the structure is an ordered change, i.e., that the pores get progressively larger or smaller in one direction.

Referring to the drawing, FIG. 1 illustrates the desired structure of a material ranging in pore size from 5–50 microns. It is apparent that a uniform progression of pore-size between the two faces is essential.

FIG. 2 is an example of an undesired tortuous path between the two faces.

Accordingly, it is an object of the present invention to provide a uniformly graded pore structure accomplished by a reduced number of steps during the formation and further, eliminating the need for carefully fractionated expensive powders.

It is another object of the invention to provide fuel cell electrodes having multiporous structures containing an activated surface.

It is another object of the invention to provide multiporous electrodes having a high degree of electrochemical stability.

It is still another object of the invention to provide a method of making a multiporous electrode using a minimum number of steps and utilizing powders having a random distribution of particle size.

Briefly, the objects of the instant invention are performed by the sedimentation of a metal powder (which includes metals, carbons, and metal oxides for purposes of this specification and claims), through a viscous fluid or gas. More specifically, an appropriate metal powder of random particle size is suspended in a column containing a liquid such as water, and the particles allowed to sediment upon a receiving plate. After the sedimentation the liquid is drained from the vessel and a light vacuum is applied to the plate. The particles on the plate are then sintered or bonded to form a multiporous structure expedient for fabrication of a fuel cell electrode. It is possible by modification of the techniques employed, such as centrifuging, to form structures which are flat, cylindrical, or of some other fitting shape.

One modification is to sediment particles coated with a thermo-setting resin upon a gauze or other flexible cloth. After the sedimentation is complete, the liquid suspending agent is drained off above the plate and a light vacuum applied. The particles upon the gauze or flexible cloth are heated to set the resin. The set particles upon the gauze are shaped to form a cylinder or some other configuration before sintering or bonding the multiporous structure. The thermo-setting resin to be used in this technique is exemplified by epoxide resins, such as the Epons marketed by Shell Development Co., phenol-formaldehyde, urea formaldehyde, and the polyamide resins. In selecting a resin, it is only necessary that the resin be compatible with the metal to be coated and capable of being thermoset.

Referring again to the drawings, FIG. 3 represents a diagrammatic view of a plate showing the coarse particles, B on the bottom and the small particles A superimposed thereon. The composite layer when compacted, bonded or sintered results in a multiporous structure having the largest pores at layer B and the smaller pores at layer A as shown schematically in FIG. 4. The structure permits good gas diffusion from side B, and maximum electrode pore-activity at side A. The position of the interface can be accurately located by changing the differential pressure across the porous structure.

Systems appropriate for performing the instant process can be easily devised or there are many existing apparatuses capable of modification which can be used in carrying out the instant invention. A system which I have found particularly advantageous is made up of a column about 18" in height and about 3" in diameter having baffles positioned from about 4" from the top of of the column and extending downward to about 4" from the bottom of the column (see FIGS. 5 and 6). Immediately below the baffles at the bottom of the column there is means for inserting a plate to collect the sedimented particles. Below the sedimentation plate there is a vacuum means which allows the final traces of water to be removed from the sedimented particles. In operation, the powdered metal is suspended in the liquid at the top of the column with the liquid in the column being agitated by a mechanical stirrer. The water in the baffled portion of the column remains relatively still, allowing the metal particles to gradually fall to the bottom of the column by gravitational force onto the sedimentation plate. As is apparent, numerous modifications of the system can be made to accomplish the same result. It is only necessary that the apparatus used will allow good separation of particle sizes. The rate of sedimentation is controlled by the rate of fall of the particles in the fluid and the height of the fluid column.

In the instant invention the powdered metal used to form the multiporous structure is not critical. However, metals found to be particularly advantageous, because of their superior fuel cell characteristics, are carbon, platinum, palladium, neodymium, nickel, cobalt, rhodium, ruthenium, iron, alloys, copper, gold, silver, cadmium, zinc, chromium, and molybdenum. The material can be used as powders of random particles size ranging from about 0.5 micron to ⅛ of an inch in diameter. However, powdered materials having a particle size of from about 1–200 microns are usually preferred.

The suspending liquid can be any readily available liquid and is thus not particularly critical. However, because of its availability, water or a mixture of water and glycerine or a glycol is preferred. In a system where carbon is the metal to be plated, it is, of course, necessary to use a suspending agent other than water since carbon has a density of less than 1. Hexane has been found to be particularly congruous with carbon. Other liquid suspending agents are glycerine, polyethyleneglycol, propyleneglycol, ethyleneglycol, butanol, pentanol, heptanol, octanol, heptane, octane, toluene, ethylacetate and dimethlyformamide. It has been found that, while not essential, it is often desirable to use a surface wetting agent to insure that no air bubbles are entrapped in the metal particles. The non-ionic surfactants are preferred, however, cationic and anionic surface agents can also be used.

The following examples are provided as typical illustrations of the instant invention. However, they are not to be construed to limit the invention but are set forth merely to show preferred embodiments.

*Example I*

25 parts of nickel powder having a random particle size of from about 5 to 100 microns was added to the top of an 18 inch column designed in close conformance with that illustrated in FIG. 5 of the drawing, containing water as the suspending agent and .01% of Aerosol OT, an anionic surfactant marketed by American Cyanamid Co. which is a dioctyl ester of sodium sulfosuccinic acid.

The liquid in the top of the column was agitated with a mechanical stirrer. The liquid in the baffled area remained substantially still. The agitated powders sedimented gradually to the bottom of the column due to gravitational force. The liquid suspending agent was drawn off and a light vacuum was applied to the sedimented plate. The plate and particles were placed in a vacuum furnace and sintered at a temperature of from 1650°–1700° F. for 3½ hours. The resultant nickel structure was activated by vacuum impregnation with an aqueous solution of nickel chloride followed by drying of the electrode and reduction of the salt to the metallic state by heating in a vacuum oven at 400° C. in an atmosphere of forming gas (10% hydrogen and 90% nitrogen). The activated material was tested as an electrode in a fuel cell on the fuel gas side and found to possess excellent electrochemical performance characteristics.

*Example II*

30 parts of silver powder having a random particle size of from about 5–50 microns was added to the top of an 18″ column containing an aqueous mixture of 20% ethyleneglycol and .01% of Span 20, a non-ionic surfactant marketed by Atlas Powder Co. which is a sorbitan monolaurate. The liquid at the top of the column was agitated with a mechanical stirrer whereas the liquid in the baffled area of the column remained substantially still. The agitated powders settled gradually to the bottom of the column by gravitational force onto a receiving plate. The liquid suspending agent was drawn off and a light vacuum was applied to remove the final traces of water from the sedimented particles. The plate and particles were placed in a vacuum furnace at a temperature of from 650°–700° C. for a period of 1–1½ hours. The resultant structure was tested as an electrode on the oxygen gas side of a fuel cell and exhibited excellent electrochemical characteristics.

*Example III*

45 parts of platinum powder having a random particle size from about 1–35 microns and coated with a 50% solution of Epon 1001, a thermosetting resin marketed by Shell Chemical Corp., having a melting point of from 64°–76° C., an epoxide equivalent of 480 and an average molecular weight of 640, in methylethyl ketone, was added to the top of an 18″ column containing an aqueous mixture of 10% glycerol and .01% Ethofat C15, a non-ionic surfactant marketed by Armour & Co., which is a mixture of polyoxyethyleneglycol esters of fatty acids. The liquid in the top of the column was agitated with a mechanical stirrer whereas the liquid in the baffled area remained substantially still. The coated agitated powders settled gradually to the bottom of the column due to gravitational force onto a flexible cotton cloth. The liquid suspending agent was drawn off and a light vacuum applied to the sedimented particles. The particles settled upon the cotton cloth were placed in a vacuum oven and heated at a temperature of 120° C. for a period of 45 minutes to thermoset the resin coated particles. Thereafter, the cloth containing the particles was shaped to form a cylinder before sintering at a temperature of 800° C. for a period of 2½ hours in a vacuum oven. During the sintering step the cotton cloth was removed by combustion. The resultant cylinder was activated using a solution of platinum chloride and tested as an electrode in a fuel cell on the fuel gas side. The bi-porous electrode exhibited excellent electrochemical properties.

*Example IV*

40 parts of a carbon powder having a random particle size of from about 5–100 microns were added to the top of an 18″ column designed in close conformance to that shown in FIG. 5, containing hexane as the suspending agent. The liquid in the top of the column was agitated with a mechanical stirrer. The liquid in the baffled area remained substantially still. The carbon particles settled to the bottom of the column due to gravitational force where the particles were collected upon a sedimentation plate. The hexane suspending agent was drawn off and a light vacuum was applied to the plate to remove final traces of solvent. The particles on the plate were pressed at 3000 p.s.i. for five minutes and heated at 1050° C. in an inert atmosphere for 2½ hours. The resultant structure was activated by vacuum impregnation with a 2% aqueous solution of palladium nitrate. The impregnated carbon structure was then introduced into an oven at 200° C. through which a current of hydogen gas was passed to produce a palladium activated surface upon the carbon substrate. The activated bi-porous carbon plate exhibited excellent electrochemical stability when used in fuel cells utilizing solid, fused and liquid electrolytes.

In Examples I to IV, inclusive, other metals can be used in making the bi-porous structure depending to a large extent upon whether the electrode is to be used at the fuel gas side or the oxidizing gas side of the electrode. The invention is not dependent upon the selection of any particular metal, since this feature is within the ability of one skilled in the art. Further, the sintering temperature of the process depends upon the metal employed. Usually, the temperature is in the range of from about 500°–900° C.

It is also possible, in order to suit a particular need, to manufacture the bi-porous structures of the instant invention by stages. For example, a layer having from about 100 micron particles could be laid down and sintered or bonded. A second layer of from about 10 to 50 micron particles could be laid down on top of this first layer and bonded to it. If desired, a third layer of from 1 to 10 micron particles could be laid down on top of the second layer and bonded or sintered to the composite. The different layers can be of the same or different metals.

The instant invention is not to be construed as being limited by the illustrative examples. It is possible to produce still other embodiments without departing from the inventive concept herein disclosed. Such embodiments are within the ability of one skilled in the art.

It is claimed and desired to be secured by Letters Patent:

1. The method of making an electrode for a fuel cell comprising the steps of (1) coating metal particles having a random particle size of from 0.5 micron to ⅛ inch in diameter with a thermo-setting resin, (2) suspending said coated metal powder in a fluid body to obtain a separation of the metal particles of said metal powder, said fluid body being of sufficient height to permit sedimentation of smaller particles upon larger particles, and said fluid body having a density less than the density of said metal powder, (3) sedimenting said coated metal particles through said fluid, (4) collecting the particles on a receiving plate, (5) removing the fluid from the particles, (6) heating said coated particles sufficient to melt said thermo-setting resin, (7) cooling said particles to obtain bonding of said particles, (8) shaping said particles, and (9) heating at a temperature sufficient to carbonize said thermo-setting resin and sinter said metal particles.

2. The method of claim 1, wherein the fluid body is water.

3. The method of claim 1, wherein the fluid body is a mixture of water and glycol.

4. The method of claim 1, wherein the metal particles have a particle size of from 1 to 200 microns.

References Cited by the Examiner

UNITED STATES PATENTS

| | | | |
|---|---|---|---|
| 690,278 | 12/1901 | Heathman | 209—208 |
| 1,377,645 | 5/1921 | Weiss | 136—122 |
| 2,300,048 | 10/1942 | Koehring | 75—208 |
| 2,887,227 | 5/1959 | Dunham | 209—209 |
| 2,914,596 | 11/1959 | Gorin et al. | 136—86 |
| 2,947,797 | 8/1960 | Justi et al. | 136—86 |

FOREIGN PATENTS

| | | |
|---|---|---|
| 544,969 | 5/1942 | Great Britain. |
| 781,433 | 8/1957 | Great Britain. |

WINSTON A. DOUGLAS, *Primary Examiner.*

JOSEPH REBOLD, JOHN R. SPECK, JOHN H. MACK, *Examiners.*